G. W. KRAFT, Jr.
Vehicle Wheel.
No. 231,333.
Patented Aug. 17, 1880.
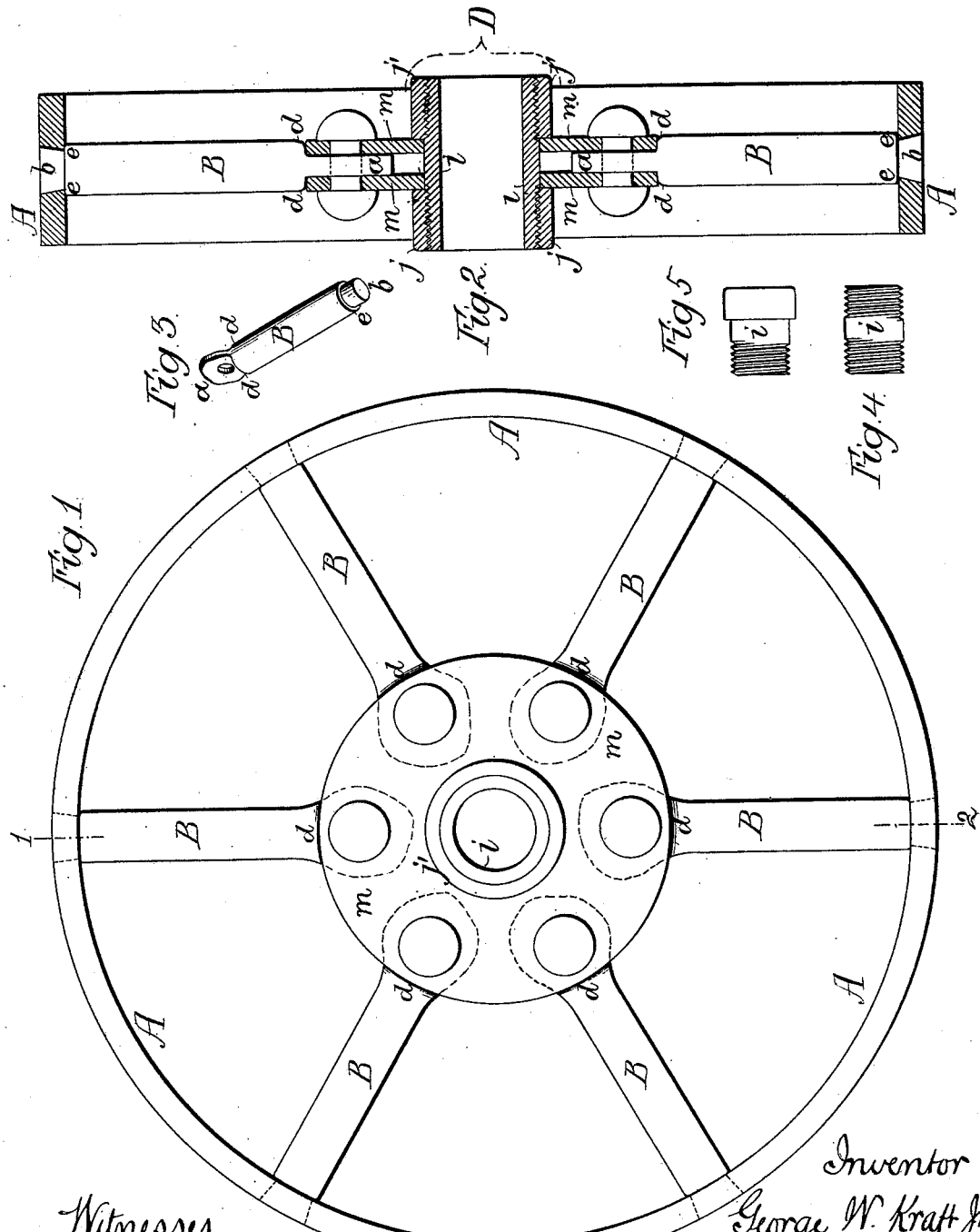

UNITED STATES PATENT OFFICE.

GEORGE W. KRAFT, JR., OF PHILADELPHIA, PENNSYLVANIA.

VEHICLE-WHEEL.

SPECIFICATION forming part of Letters Patent No. 231,333, dated August 17, 1880.

Application filed January 22, 1880.

*To all whom it may concern:*

Be it known that I, GEORGE W. KRAFT, Jr., a citizen of the United States, residing in Philadelphia, Pennsylvania, have invented an Improved Wrought-Iron Wheel, of which the following is a specification.

My invention consists of a wrought-iron wheel constructed, as described hereinafter, with the view to the attainment of great strength, lightness, and durability at a comparatively small cost, the wheel being intended for use wherever it is available as a cheap substitute for the more fragile and heavier wheels of cast-iron.

In the accompanying drawings, Figure 1 is a side view of my improved wheel; Fig. 2, a transverse section on the line 1 2; Fig. 3, a perspective view of one of the spokes; Fig. 4, a detached view of the central part of the hub; Fig. 5, a modification of Fig. 4.

In the wheel shown in Figs. 1, 2, 3, and 4 the rim A consists of a bent and welded bar of wrought-iron, which may be made circumferentially true by suitable dies or appliances used by blacksmiths in making the tires of wheels for vehicles. Each of the spokes B consists of a bar of wrought-iron, preferably round, the bar being flattened and drilled at one end, $a$, and reduced in diameter at the opposite end, $b$, so that two shoulders, $d$, shall be formed at the inner end of the spoke, one on each side of the same, and a shoulder, $e$, near the outer end of the spoke. The hub D of the wheel consists of three parts, namely, the short tube $i$, which may be a section of an ordinary lap-welded tube, and the nuts or thimbles $j j'$. The tube is threaded at and near both ends, and the central portion is plain, so as to fit snugly in the central openings of the annular plates $m\ m$.

The nuts or thimbles $j j'$ may also be sections of lap-welded tubes, or they may be internally-threaded ferrules of malleable iron.

In putting the wheel together the reduced ends of the spokes are passed through countersunk holes in the rim and riveted to the same, after which the plates $m\ m$ are riveted to the flattened ends of the spokes, one on each side of the same, and the wheel is completed by fitting the short tube $i$ into the central openings of the plates $m\ m$ and applying the nuts to the tube, which may be accomplished by a pair of ordinary gas-tongs.

If the distance between the shoulders $d$ and $e$ be the same in all the spokes and gaged to accord with the proper distance between the inside of the rim and the outer edges of the plates $m\ m$, and if the latter and the rim are true, the wheel itself must necessarily be true when put together, without any tedious adjustment or alteration of its parts.

The tube $i$ may be of malleable iron, in which case a collar may be cast on the tube at one end of the same, as in Fig. 5, and one nut only will be required.

The wheel may be applied to any uses where its capacity for effectually resisting shocks and strains would be available. It may, for instance, be used in connection with gas-house barrows, which are subjected to rough uses, or it may be applied to trucks which have to be wheeled over rough pavements, and it may be applied to many other uses, the rims being in some cases flanged and adapted to rails.

One of the advantages of my invention is that the tube $i$, which is subjected to the greatest wear, can be readily detached from the wheel to make way for a new one without disturbing the integrity of the wheel itself.

I claim as my invention—

The combination, in a wrought-iron wheel, of the rim A, the spokes B, each having shoulders $d$ and $e$, the annular plates $m\ m$, riveted to the spokes, and the central tube, $i$, secured to said plates $m$, all substantially as set forth.

In testimony whereof I have signed my name to this specification in the presence of two subscribing witnesses.

GEO. W. KRAFT, JR.

Witnesses:
ALEXANDER PATTERSON,
HARRY SMITH.